United States Patent
Quist et al.

(10) Patent No.: US 12,111,200 B2
(45) Date of Patent: Oct. 8, 2024

(54) PHASED ARRAY RADAR FOR FLUID SENSING

(71) Applicant: HADRONEX, INC., Escondido, CA (US)

(72) Inventors: Gregory M Quist, Escondido, CA (US); David A Drake, Escondido, CA (US); David B Rees, Encinitas, CA (US); Lawrence B Merchell, San Marcos, CA (US)

(73) Assignee: HADRONEX, INC., Escondido, CA (US)

( * ) Notice: Subject to any disclaimer, the term of this patent is extended or adjusted under 35 U.S.C. 154(b) by 112 days.

(21) Appl. No.: 17/644,331

(22) Filed: Dec. 14, 2021

(65) Prior Publication Data

US 2022/0187117 A1 Jun. 16, 2022

Related U.S. Application Data

(60) Provisional application No. 63/125,940, filed on Dec. 15, 2020.

(51) Int. Cl.
*G01F 23/284* (2006.01)
*G01S 13/42* (2006.01)
*G01S 13/02* (2006.01)

(52) U.S. Cl.
CPC .......... *G01F 23/284* (2013.01); *G01S 13/426* (2013.01); *G01S 2013/0263* (2013.01)

(58) Field of Classification Search
CPC ................. G01F 23/284; G01S 13/426; G01S 2013/0263
See application file for complete search history.

(56) References Cited

U.S. PATENT DOCUMENTS

| 10,289,126 | B2 * | 5/2019 | Shock | E21B 43/2607 |
| 2009/0299662 | A1 * | 12/2009 | Fehrenbach | G01F 23/28 73/290 V |

(Continued)

FOREIGN PATENT DOCUMENTS

| CN | 109073447 B | * 12/2020 | G01F 23/292 |
| DE | 20122754 U1 | * 8/2007 | G01F 23/284 |

OTHER PUBLICATIONS

Baumer International (Radar sensors. (n.d.). Baumer International. https://www.baumer.com/ca/en/product-overview/distance-measurement/radar-sensors/c/291) (Year: 2019).*

(Continued)

*Primary Examiner* — Peter M Bythrow
*Assistant Examiner* — Nazra Nur Waheed
(74) *Attorney, Agent, or Firm* — Jonathan Kidney; Intelink Law Group, P.C.

(57) ABSTRACT

A covered enclosure surface sensing device, with an on-chip 2-D phased array radar sensor, beam-steering to create a three-dimensional image of the enclosure's interior. An environmental encasing contains a processor, a motion detector, a communication module coupled to an external communication antenna, a power source. It is attachable to a lid or upper side surface of the enclosure. After scanning, the device measures positions of, if present, flexible surfaces and obstructions within the enclosure and a level of liquid or powder in the bottom of the enclosure. If the enclosure contains an open channeled inlet and outlet, it measures liquid levels in the inlet and outlet, the position of the inlet and outlet, and the speed of fluid in the inlet and outlet. If the motion detector detects a threshold movement of the lid or surface sensing device, the phased array radar sensor performs a reorientation scan.

27 Claims, 9 Drawing Sheets

(56) References Cited

U.S. PATENT DOCUMENTS

| | | | |
|---|---|---|---|
| 2015/0377681 A1* | 12/2015 | Kleman | G01S 13/88 |
| | | | 73/290 V |
| 2018/0003535 A1* | 1/2018 | Rick | G01F 1/663 |
| 2018/0328776 A1* | 11/2018 | Gurumohan | B67D 3/0093 |
| 2019/0086531 A1* | 3/2019 | Rick | G01S 13/88 |

OTHER PUBLICATIONS

PCT Search Report, PCT Appln PCT/US08/00253, Jan. 8, 2008, 7 pages.

* cited by examiner

PHASED ARRAY RADAR FOR FLUID SENSING

CROSS-REFERENCE TO RELATED APPLICATION(S)

This application claims priority to and the benefit of U.S. Provisional Patent Application No. 63/125,940, filed Dec. 15, 2020, the contents of which are hereby incorporated by reference in its entirety.

FIELD

This invention relates to the adaptive and accurate measurement of fluid levels and flows in confined spaces. More specifically, to phased array-based flow measurement within manholes and vault bottoms or complex structures, either with multiple water flow paths or with many obstructions.

BACKGROUND

In order to install sensing systems for water measurement, for example in manholes, a laborious task of aiming and adjustment is required, particularly for various inlet and outlet pipe arrangements. Manhole or vault covers can be inadvertently moved, ruining the existing pointing alignment and causing erroneous level readings. This problem is exacerbated if the manhole or vault is in a hazardous location, such as in street traffic. The locations for such measurement are often in confined spaces, where human occupation must be minimized to avoid fall accidents or injury.

In view of the above difficulties and safety concerns, various systems and methods are presented herein for adaptive and accurate measurement of fluids that minimize the need to realign, physically enter the manhole structure. These and other advantages are detailed in the following description and figures.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a covered enclosure surface sensing device is provided, comprising: a phased array radar sensor, with a 2-D antenna array "on a chip," capable of electronically steering a radar beam to create a three-dimensional image by scanning a field of view, adapted for placement in an upper portion of the covered enclosure, wherein at least a bottom of the enclosure is scanned; a processor, processing data from and to the phased array radar sensor; a motion detector; a communication module with a data link to the processor module, and coupled to a communication antenna directing communication away from the enclosure; a power source, providing power to the phased array radar sensor, processor, motion detector and communication module; and an environmental encasing, protecting the phased array radar sensor, processor, power source, communication module, and motion detector, the environmental encasing configured to be attached proximal to a bottom of a lid of the enclosure or an upper side surface of the enclosure, wherein after scanning, the phased array radar sensor operates to measure a position of, if present, flexible surfaces and obstructions within the enclosure and a level of liquid or powder in a bottom of the enclosure, and if the enclosure contains an open channeled inlet and outlet, to measure a level of liquid in the inlet and outlet, a position of the inlet and outlet, and a speed of fluid in the inlet and outlet, wherein after the motion detector detects a threshold movement of the lid or surface sensing device, the phased array radar sensor performs a reorientation scan within the enclosure.

In another aspect of the disclosed embodiments, the above device is provided, wherein the phased array radar sensor at least one of operates within a frequency range between 10-200 GHz and the 2-D antenna array is approximately 8 cm×10 cm; and/or wherein there are a plurality of inlets; and/or wherein the lid is a manhole cover or utility vault cover; and/or wherein the measurement automatically determines at least one of a type of bottom structure, shapes or obstructions below the lid, and whether the bottom structure is circular, or linearly orientated; and/or wherein environmental casing is waterproof and at least a portion of the casing proximal to the phased array radar sensor is radar transparent; and/or, wherein the motion detector is an accelerometer; and/or wherein at least one of a median value measurement, estimation process measurement, and series of measurements are used to calculate an occluded area of a channel or pipe within the enclosure, enabling an accurate estimate of fluid flow in the channel or pipe; and/or wherein an estimation of water flow per unit time of water over a weir within the enclosure is derived from two measurement points established on either side of the weir; and/or wherein an estimate of flow of water per unit time through a flume in the enclosure is derived from two measurement points are established upstream and downstream from the flume; and/or wherein a flow of water from a drop hole in the enclosure is derived from two measurement points established to measure a water level from the enclosure's bottom and from the drop hole; and/or further comprising at least one of a satellite and cell tower or repeater, receiving data from the communication module and a server, processing the received data forwarded from the least one satellite and cell tower or repeater; and/or wherein two-way communications are wirelessly established between the communication module and the server, for reporting of conditions within the enclosure and receiving commands from the server; and/or further comprising an external environmental sensor, communicating to the server; and/or further comprising a mounting mechanism to attach the environmental encasing to the bottom of the lid of the enclosure or the upper side surface of the enclosure; and/or wherein the power source is at least one of batteries, a solar panel, and a thermoelectric generator; and/or wherein the surface sensing device is encapsulated within the lid; and/or wherein the phased array radar sensor determines a Doppler velocity of fluid in the enclosure bottom; and/or wherein the phased array radar sensor is comprised of a plurality of separate antenna arrays.

In another aspect of the disclosed embodiments, a method to monitor a covered enclosure's surface(s) having at least one of an inlet and outlet for material flow is provided, comprising: mounting an environmental protective encasing, containing a phased array radar sensor with a 2-D antenna array "on a chip," a processor, a power source, a communication module, and a motion detector, proximal to a bottom of a lid of the covered enclosure or an upper side surface of the enclosure; automatically scanning an electronically steered radar beam to create a three-dimensional image data within the phased array radar sensor's field of view, to create an image of at least a bottom and walls of the enclosure, shapes or obstructions below the lid, and sense directions for measurements; automatically measuring a level of material or powder in a bottom of the enclosure, and if the enclosure contains an open channeled inlet and outlet, a level of liquid in the inlet and outlet, a position of the inlet and outlet, and a speed of fluid in the inlet and outlet; automatically processing the data from the phased array radar sensor; automatically detecting motion of the at least one of the environmental casing and lid. communicating at least one of the detected motion and processed data to an external server; and receiving instructions from the server for at least one of scanning and measuring; wherein real-time level and flow data in the enclosure is obtained.

In yet another aspect of the disclosed embodiments, the method is provided, wherein the measuring is periodic, a non-operating portion of the measuring being longer than a measuring portion to minimize power consumption; and/or comprising, automatically scanning and calibrating, to minimize in-person occupation in the enclosure; and/or wherein measurement data is locally cached in a memory of the processor and transmitting and transmitting to the server at a predetermined time; and/or wherein scanning and measuring is accurately performed within a temperature range greater than −20 C and less than 70 C; and/or where the measurements have a level resolution better than 3 mm; and/or wherein the at least one of the scanning and measurement utilizes polarized wave; and/or wherein the at least one of the scanning and measurement is at least one of frequency, amplitude modulated, and Doppler identified.

DETAILED DESCRIPTION

The water measurement problem in manholes and vaults is confounded by several location specific conditions:

1. Water measurements are often done in hazardous locations. This includes nearby traffic risk, dangerous gases, potential electrical risk from pumps, and risks of falling into a manhole or vault. The traffic risk drives reducing exposure time to prevent serious accidents.

2. Manholes and vaults often have complex bottom surfaces that must be evaluated for optimal measurement points.

3. Manholes and vaults often have intrusions from bracketry or ancillary drop hole pipes that come in from the side, above the true bottom.

4. The manhole or vault covers can be rotated and moved from their original calibrated positions. This happens during negligent maintenance, impacts from traffic wheel motions, and street or industrial vibration.

5. Almost all manholes and vaults are considered confined spaces, which trigger special operations to prevent injuries from hazardous gasses or lack of oxygen. These injuries and fatalities can occur within seconds, so any way to avoid exposure is an enormous benefit. Most entry into confined spaces require qualified personnel with cranes and support staff. In many jurisdictions, it is no longer legal to use ladders commonly found in older vaults.

It is impossibly expensive to have personnel manually check these structures, on a frequent enough basis to prevent damage, overflows and spills. Also, these structures have complex or potentially dangerous environments. FIGs, 1-8 below illustrate various manhole and vault configurations that are difficult or dangerous to measure, which would be easily measurable by the exemplary embodiments discussed in FIGS. 9-12.

Figure 1:
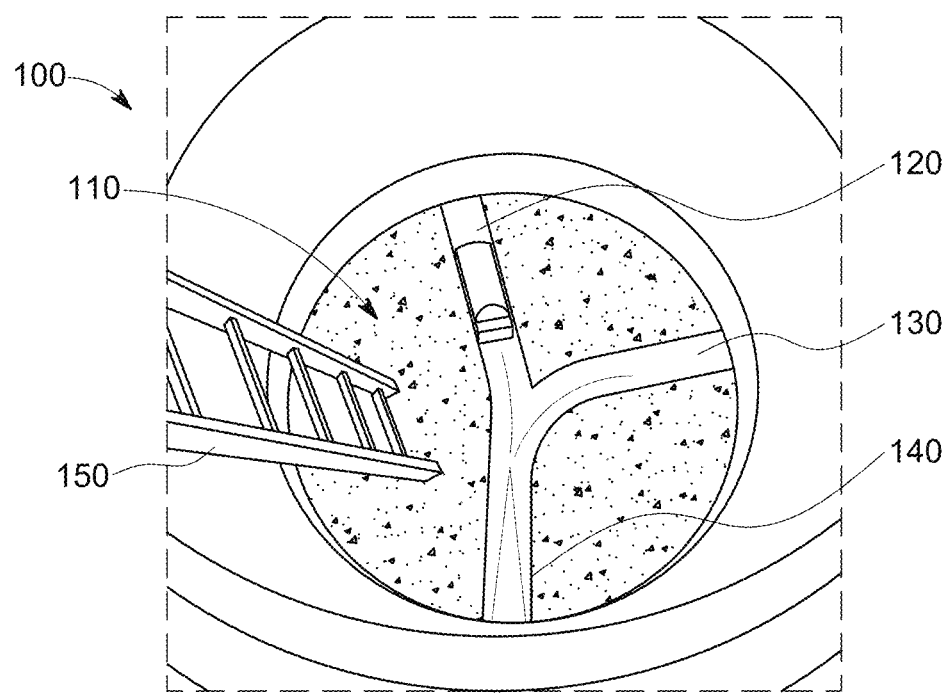
FIG. 1 is an image of a typical manhole with two entry pipes merging to a single outlet pipe.

FIG. 1 is an image of a typical manhole 100 with a bottom 110 having two entry pipes 120, 130 merging to a single outlet pipe 140. Ladder 150 is necessary for a maintenance worker (not shown) to ingress into the manhole 110 and reach the bottom 110 so as to accurately measure the fluid levels at the pipes 120, 130, 140. The complex floor 110 is a safety hazard for the maintenance worker.

It is well understood that the "pipes" are not fully enclosed pipes but open channel flow, as according to common manhole terminology and conventions.

Figure 2:
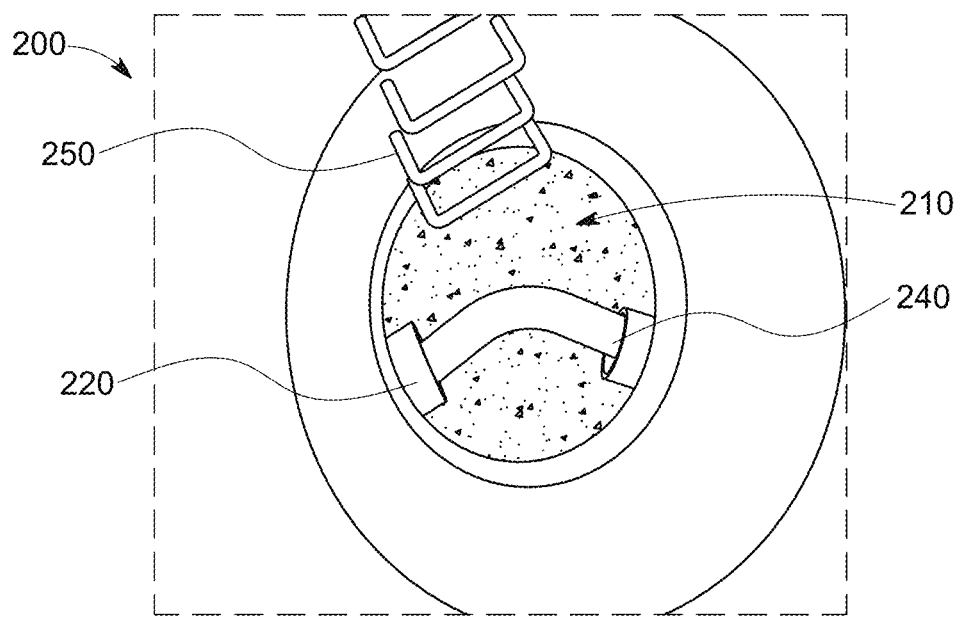
FIG. 2 is an image of another manhole, having a single entry pipe and a single outlet pipe.

FIG. 2 is an image of another manhole 200, having bottom 210 containing a single entry pipe 220 and a single outlet pipe 240. Again, ladder 250 is necessary for a maintenance worker to reach the pipes and take accurate measurements.

Figure 3:
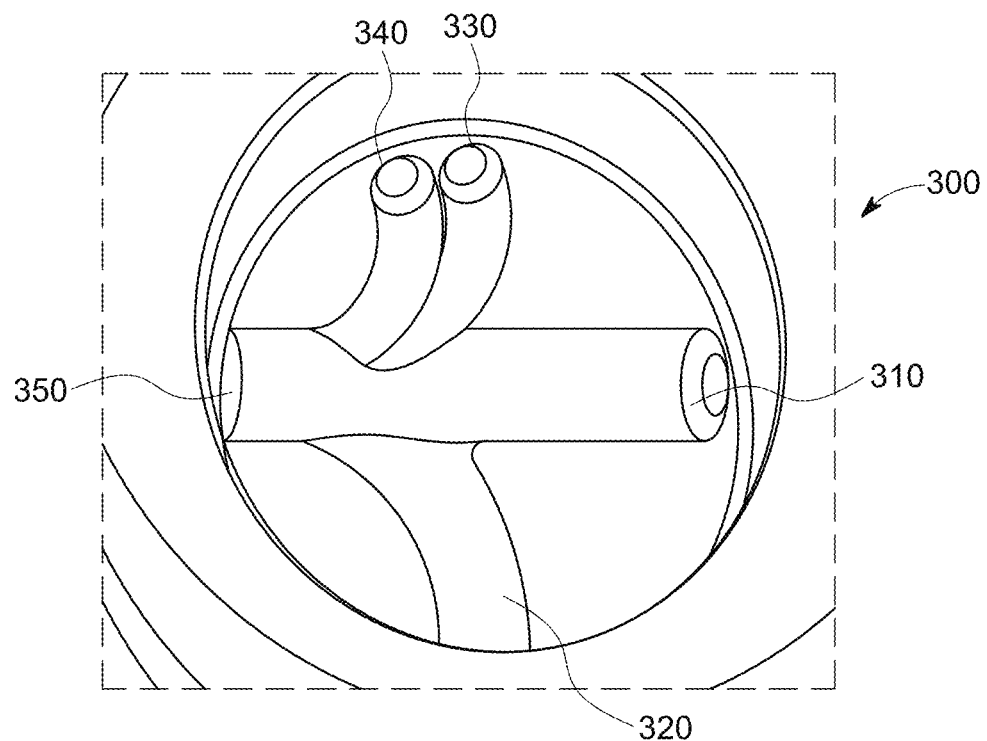
FIG. 3 is an image of another manhole with four entry pipes.

FIG. 3 is an image of another manhole 300, showing four entry pipes 310, 320, 330, 340 merging into a single outlet pipe 350. The increasing complexity of the pipe arrangement makes it more difficult for a maintenance worker to perform the various needed measurements as well as find sufficient footing.

Figure 4:
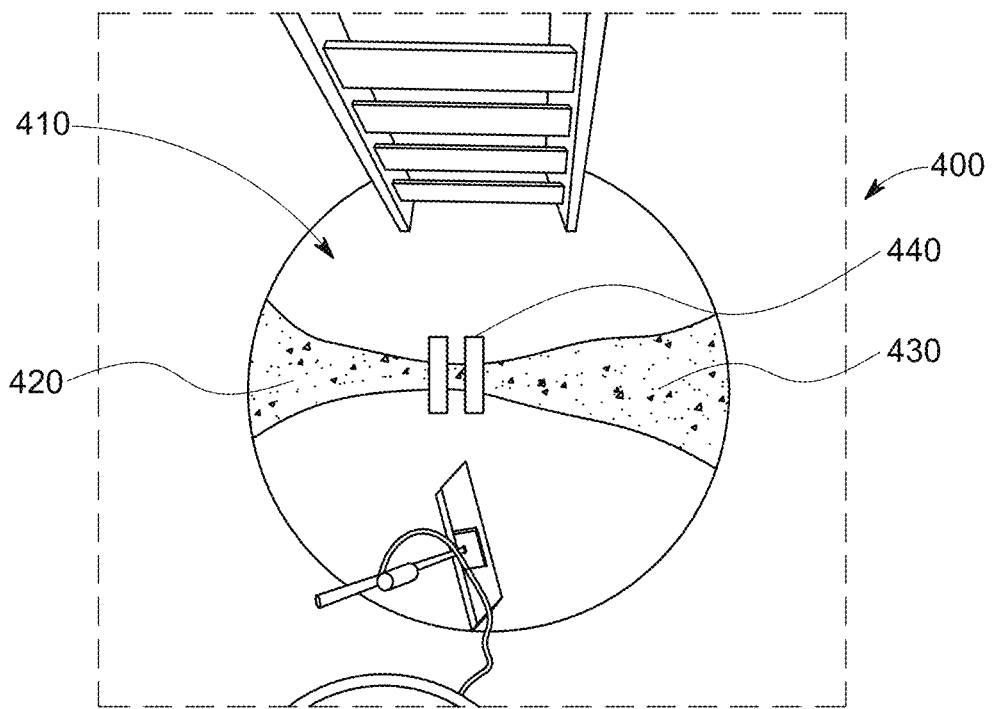
FIG. 4 is an image of another manhole containing a "Parshall flume" piping arrangement.

FIG. 4 is an image of another manhole 400 containing a "Parshall flume" piping arrangement. Here, water measurements are made between the central waist 440 which separates the entry pipe 420 and the outlet pipe 430. A standard formula comparing the height measurements can be used to determine the flow rate.

The complex bottom surfaces of the above manholes may have different orientations than those shown. Because of the pipe's shape and orientations, measurement equipment must be precisely oriented (to the pipes). If the measurement equipment is mechanically "tethered" to the manhole cover and the cover is rotated or shifted in some way, the resulting "pointing" of the sensor will be off and the resulting measurement will be inaccurate. Often, in the conventional arts, multiple individual sensors are pointed to the various pipes to obtain the discriminated measurements. It is also understood that the presence of a ladder or other obstruction within a manhole or vault can present an obstacle or interfere with the accuracy under a typical measurement scheme.

Figure 5:
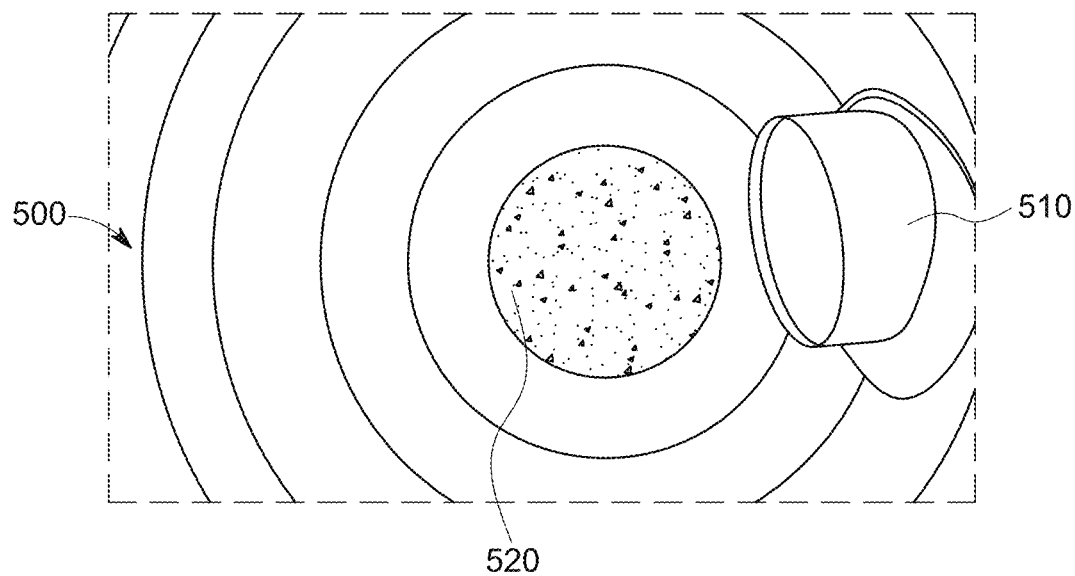
FIG. 5 is an image of another manhole with a protruding drop hole pipe.

FIG. 5 is an image of another manhole 500 with a drop hole pipe 510 protruding from a side of the manhole 500. The protrusion of the pipe 510 into the manhole's opening can interfere with typical measurement schemes.

Figure 6:
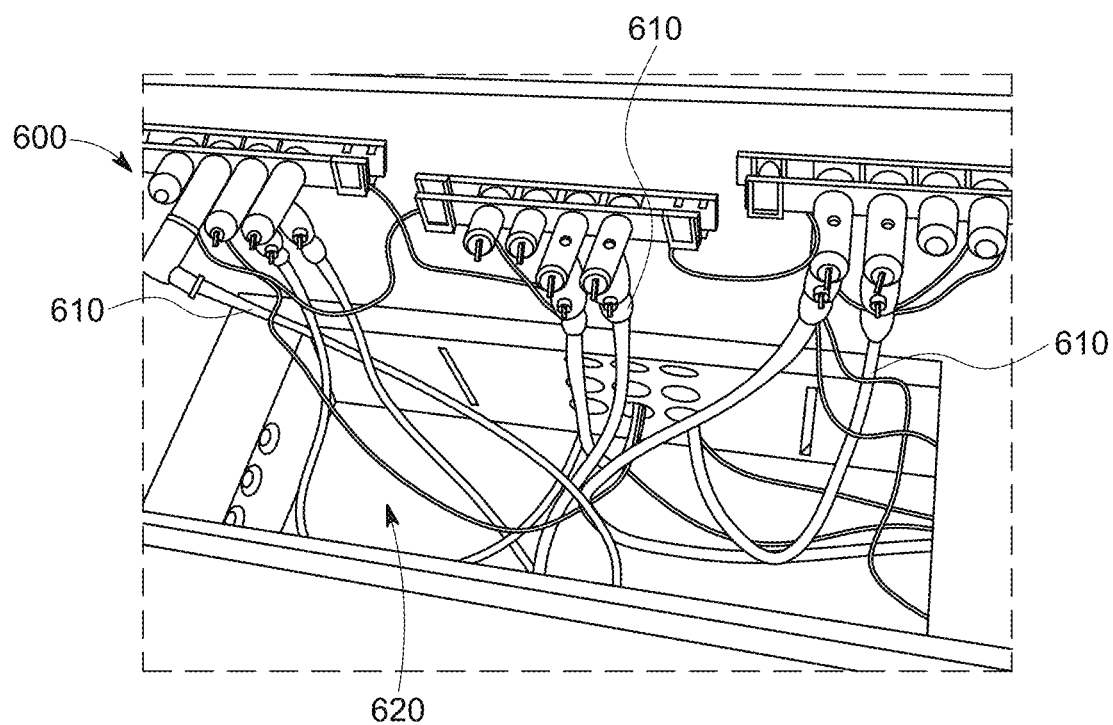
FIG. 6 is an illustration of a typical electrical vault with a series of cables.

FIG. 6 is an image of a typical electrical vault 600 with a series of cables 610 entering the vault and the cables traversing across a shallow defined bottom floor 620. Note, the bottom floor 620 (if being sealed) will accumulate water or fluids and can be a good target for sensing/detecting such intrusion.

Figure 7:
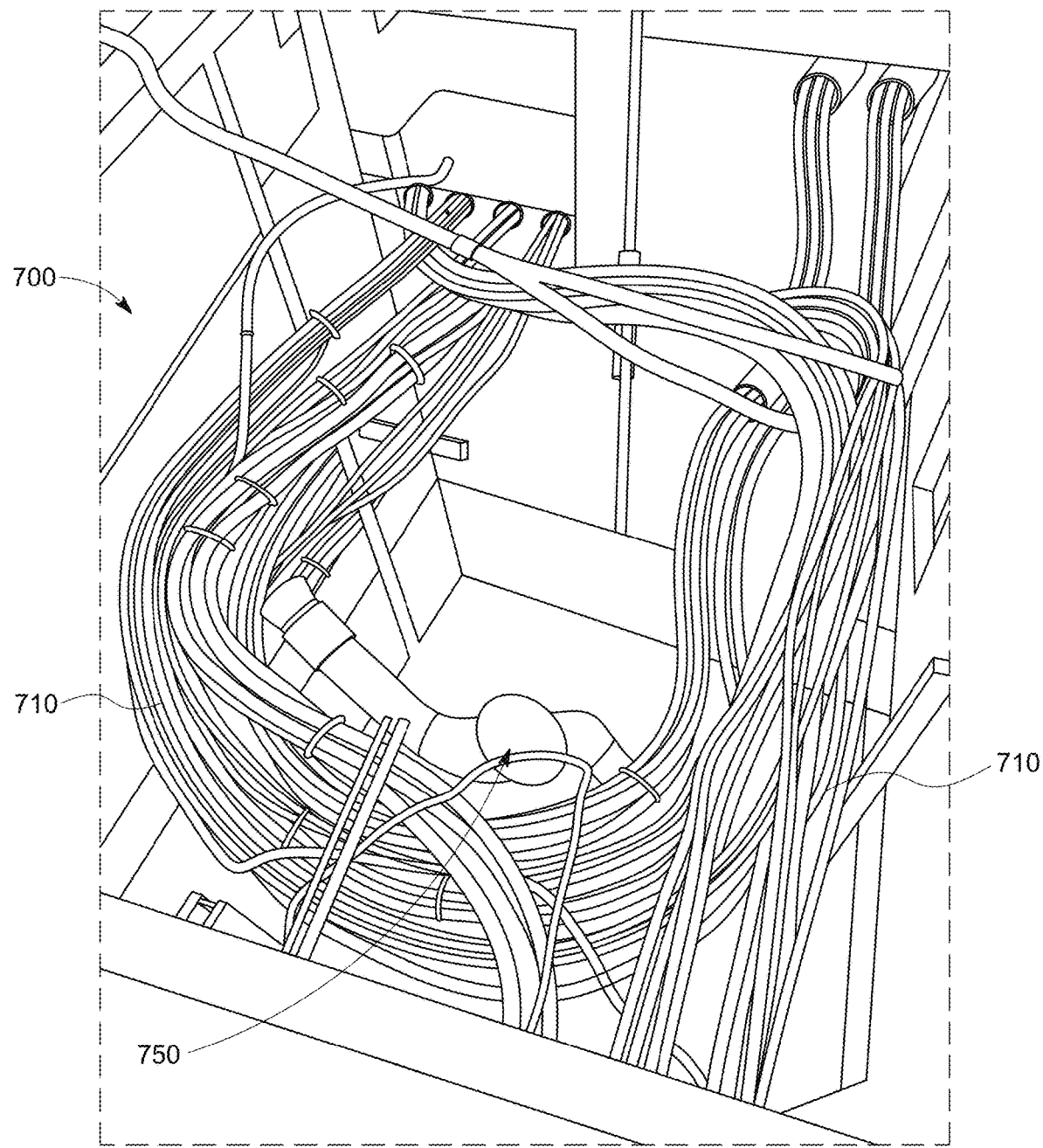
FIG. 7 is an image of another electrical vault or fiber optic vault.

FIG. 7 is an image of another electrical vault or fiber optic vault 700 manhole, substantially more cabled 710 and wider and deeper than the vault of FIG. 6. A maintenance worker 750 standing in the vault 700 is shown for scale.

Figure 8:
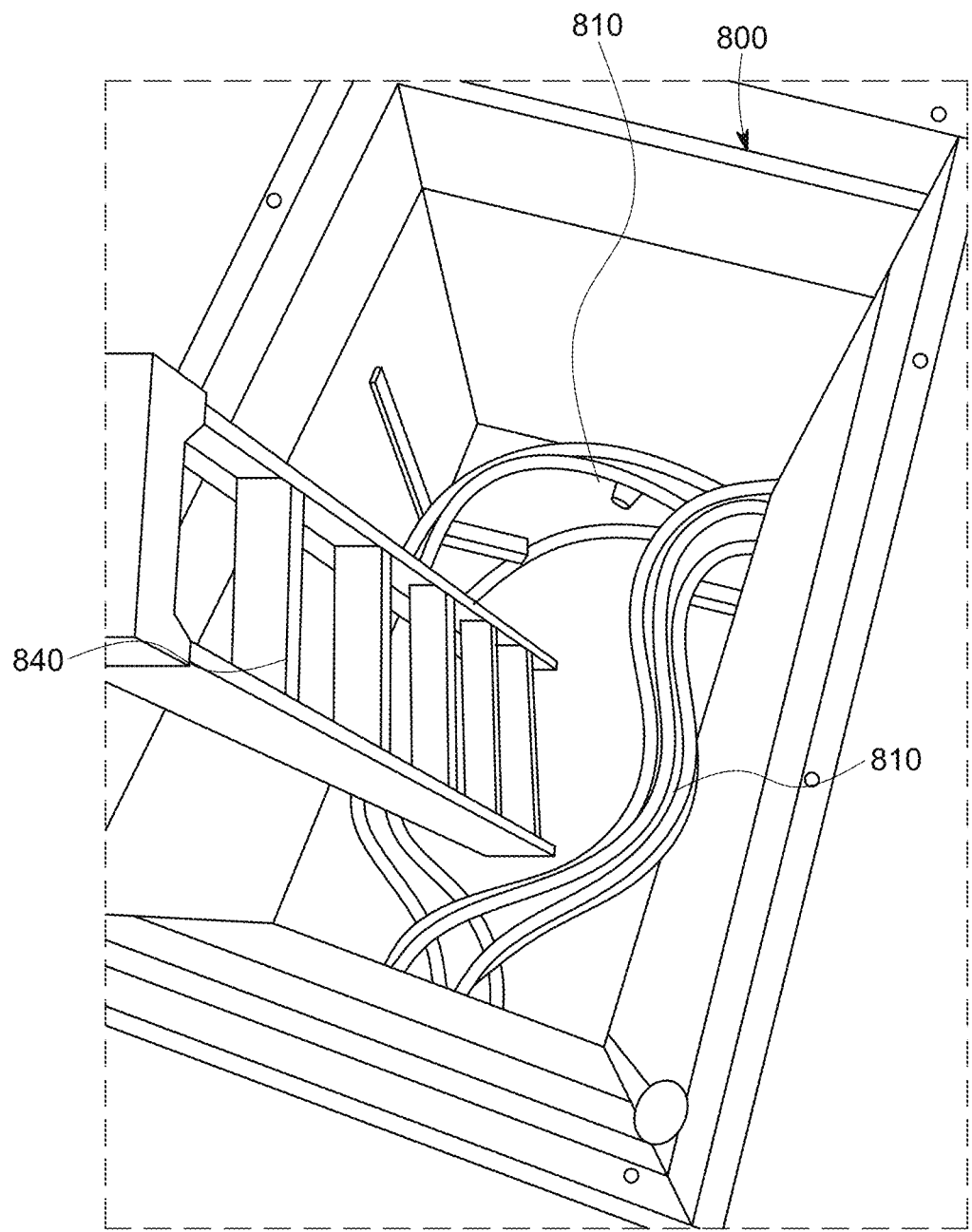
FIG. 8 is an image of another electrical vault with cables near its bottom.

FIG. 8 is an image of another electrical vault 800 with cables 810 near the bottom of the vault 800. This vault 810 has more limited space than the vault of FIG. 7 and requires a ladder 840 for inspection of the cables 810.

To address the above situations, the devices and methods described herein employ phased array radar to sense the detailed liquid flow specifically, but not limited to, the manholes or vaults and to identify and select optimal sensing locations. Because manhole or vault covers can be inadvertently moved, ruining the existing pointing alignment and causing erroneous level readings, a phased system can automatically recalibrate to the desired direction or angle. Upon cover motion detection, the exemplary apparatus can automatically to recalibrate the sensing directions or under direct command.

By use of a phased radar system, the radar can automatically calibrated to detect the shapes or obstructions below the cover and provide optimal sensing directions for range and velocity measurements. As well as automatically determining the type of bottom structure and the circular, or linear orientation of the structure and adjust the sensing directions, if they change. Depending on beam orientation, the shape and walls of the enclosure can be determined, including the area where fluid flow is taking place, and measure the level of the fluid flow and the surface velocity of the fluid flow. In addition, the phased array radar can sense water velocity by use of Doppler measurements, thus providing a method for accurate water flow volume estimation under a wide variety of conditions. The Doppler measurement can also sense the direction of fluid flow. The phased array system can be installed at the top of the enclosure and does not need to extend far below, thus preventing damage to the system if the cover is slid sideways.

In various embodiments, the exemplary system is able to detect blockages of water flow fast enough to trigger timely intervention by maintenance staff to prevent sewer and other spills from reaching the environment and human contact. Another capability in some embodiments is to understand the amount of instantaneous flow or integrated total flow over a specified period of time to provide means to understand what external influences are having an effect on flows. Another capability in some embodiments is to prevent water surcharges from storm water or leaks from shorting out high voltage electrical cables. A further capability is to support reporting for regulatory compliance in combined and separated sewers.

The exemplary sensor can be powered with a local battery, by AC, solar or thermally powered and may be continuously or periodically active. The detected condition of the fluids or water can be transmitted by one or more of radio, satellite, optical or related wireless or connected means for forwarding over the Internet to a central server system. The central server system aggregates multiple user data into a database for storage. The central system evaluates water conditions for display, reporting and alarm services. The central server system can also receive commands from users using a web interface that are transmitted back to the field units for a variety of operational changes, such as alarm limits, or phased array operational parameters.

There are many applications where there are requirements for water parameters, among these are the depth of the water from a fixed point to a location below, measurements from multiple fixed points, as from the upstream and downstream locations from a weir, the velocity of water flowing in an open channel, the depth of water in a flowing channel, estimations of the volume of water flowing per unit time, the rate of water height change, and other location dependent measurements. Measuring water parameters can be achieved by ultrasonic transmission, float positions, capacitance changes, temperature changes, simple radar, optical sensors, dielectric constant changes, pressure measurements, and methods as simple as displacing a ping pong ball or block of wood. In addition, water velocity can be determined by Doppler effects in ultrasonic and radar transmissions, as well as optical time of flight and Doppler measurements.

While the above FIGs. are in the context of a manhole or utility vault, it is understood that other enclosure types can benefit from the exemplary embodiments described below. For example, storage containers (silos, etc.) containing food, liquid, powders, etc. can proxy as an enclosure.

Figure 9:
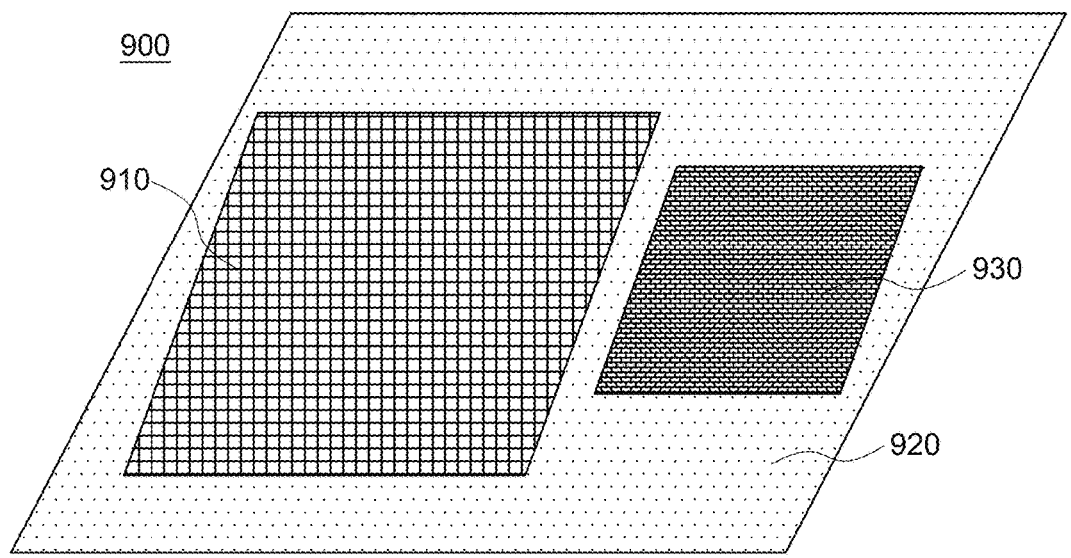
FIG. 9 is a simplified illustration of the form factor of an exemplary phased array device implemented on a printed circuit board.

FIG. 9 is a simplified illustration 900 of the form factor of an exemplary 3-D "on-chip" phased array device 910 implemented on a printed circuit board 920 controlled by an on-board transmitter/receiver and signal processor 930. The term "on-chip" is used to indicate the radiating/receiving elements of the phased array device 910 are fabricated using semiconductor processes or printed circuit board processes, or methods not requiring hand fabrication. Interconnects for power and data between the circuit elements are hidden from view. In some embodiments, the phased array can be formed on a semiconductor surface or by laying array elements on a substrate. In some embodiments, the transmitter/receiver may be detached from the signal processor and/or each can be off-board. Ancillary power, memory and communication systems are not shown, but are understood to be inherent in such a system, either on-board or off-board, with the appropriate links and wiring.

While FIG. 9 shows a single 2-D rectangular array 910, it is possible to use different shaped arrays (3-D, circular, etc.) as well as multiple similar or different array devices joined together. Therefore, the precise shape and nature of the phased array form can be varied according to design preference. The mechanics of phased array systems are very diverse and well understood in the military and communication arts. Therefore, being within the knowledge of one of ordinary "radar" skills, explicit details of the intricacies of phased array systems are not presented but only briefly addressed for enablement and reader understanding.

Figure 10:
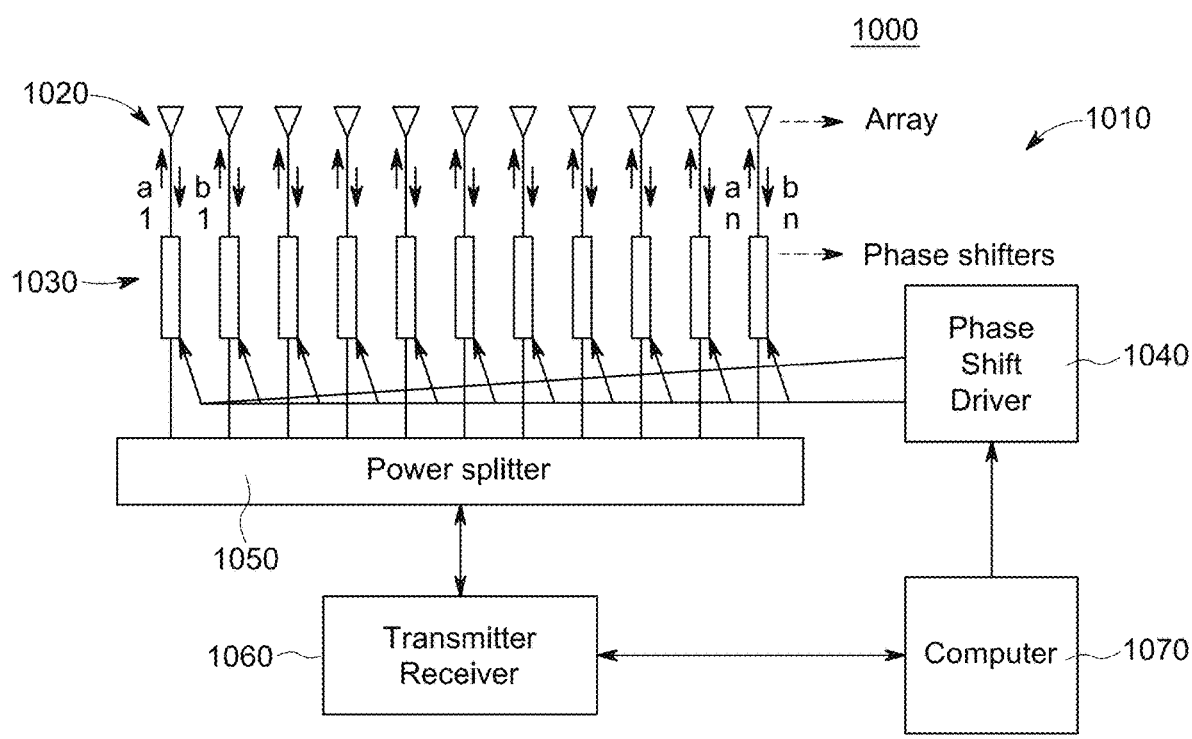
FIG. 10 is a block illustration of a phased array system.

FIG. 10 is a block illustration 1000 of a phased array system 1010, having antenna arrays 1020, coupled to phase shifters 1030 being controlled by phase shift drivers 1040. A power splitter 1050 provides paths for the energy to/from the transmitter/receiver 1060, connected to a computer or processor 1070 managing and processing the signals and phase shifting, as well as any ancillary "system" level processing and communication management, if so devised. Each element in the array 1020 acts as a transmit antenna and receive antenna, due to the duality principle. Power module (not shown), providing power to the various subsystems and a communication module (not shown) are presumed inherent for deploying such a system in a remote location, such as manhole or vault.

While FIG. 10 shows a single grouping of antenna arrays 1020, the array could consist of multiple arrays of phase and amplitude modulated components for a diversity of sensing, including polarization sensitivity and Doppler velocity measurement. The array 1020 could also include a diversity of frequencies and polarizations to increase the sensitivity of the radar signal to conditions in a manhole.

Figure 11:
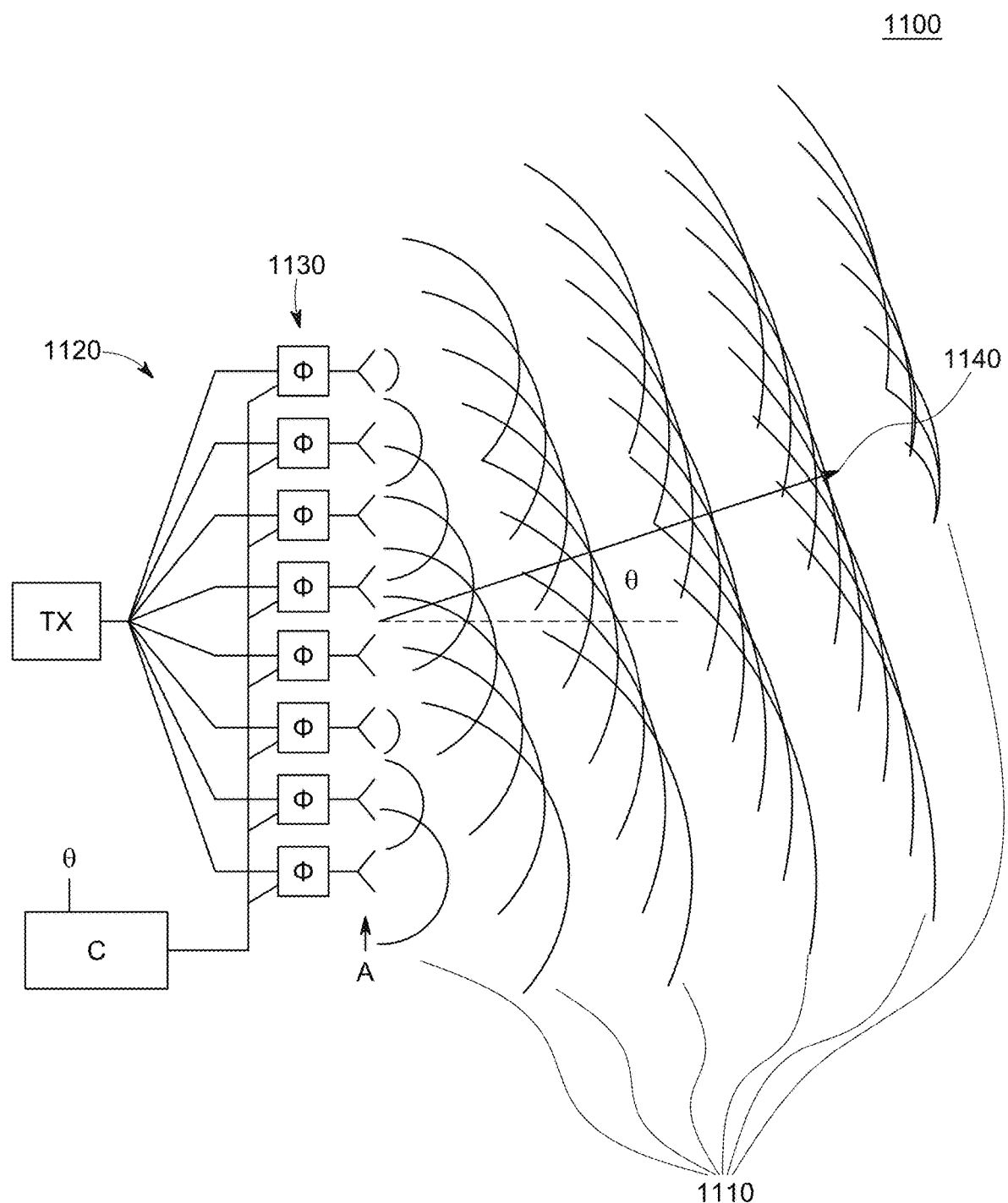
FIG. 11 is an illustration of the shifted wave fronts from a 1-dimensional phased array

FIG. 11 is an illustration 1100 of the shifted wave fronts 1110 from a 1-dimensional phased array 1120, noting the constructive and destructive interference from the phase shifting of each antenna element 1130 can move the central beam 1140 to point to a desired direction/angle. Thus, the beam(s) of phased array can be steered. For a 2-dimensional array, the steering can be both in azimuth and elevation. By varying the frequency, the size of the beam can be narrowed or widened. By adjusting power or sensitivity, the range can be increased or decreased.

As a demonstrative example, a phased array system composed of 20 to 80 GHz transmitters (TX) and receivers (RX) can be coupled to a two-dimensional or three-dimensional array of antennas. The actual frequency ranges of the TX/RX can be altered to other frequencies, depending on design preference. As a non-limiting example, frequencies can vary between 10 and 200 GHz. The signals employed can be continuous wave frequency modulated transmissions that can have varying frequency and phase with each other. In other embodiments, amplitude modulation or other modulations can be utilized. The received signals are input to signal processing circuits. This process is used to form an array of signal returns that can measure the distance to a target and the Doppler velocity of the target.

Using the above example, the "radar" image formed could have more than 10,000 sample points across a typical 1-meter diameter manhole bottom with resolution of 1 to 2 centimeters in azimuth, elevation and range. Velocity measurements should go down to 0.1 meters per second, or lower in velocity. As stated above, these values may vary dependent on the frequency and ranges used. As the frequencies go higher, the smaller the resolution.

For implementation in a manhole or vault scenario, the phased array radar can be assembled from several independent sub-systems, to form, in various embodiments, a flat or semi-flat structure that provides only short physical penetration into the vault or manhole below. For such a system, the radar will obviously point into the manhole, vault and be affixed to the bottom of the manhole cover or vault cover. The antenna array may be designed, if so desired, to include independent phase shifters for each antenna (noting some simpler phase array systems use phase shifters that operate aggregately rather than individually). The phased array radar can also be made with an independent transmit and receive array, that is, the transmit side and the receive side are separate components. The antenna arrays can be attached to multiple analog to digital converters for further digital signal processing.

The signal would include the ability to correlate the detected bottom image with a library of common images to determine the best fit. This could include the use of Fourier transforms and cross correlation, among other algorithms. The orientation of the bottom can be determined by a similar rotational correlation with known exemplars. In addition, the detection would include recommendations on measurement point for special purpose applications, such as weirs and flumes.

For example, to determine the median value measurement, or similar estimation process, a series of measurements can be used to calculate the occluded area of a channel or pipe, creating a more accurate estimate of fluid flow. For a weir, by using two measurement points established on either side of a weir, an estimation of water flow per unit time over the weir can be obtained. For a flume, by using two measurement points established upstream and downstream from the flume, an estimation of the flow of water per unit time through the flume can be obtained. For a drop hole, using two measurement points established from a bottom of the manhole and from the drop hole, the flow of water from the drop hole can be derived.

Accommodation could also be made for remote or local manual commands to either assist in the detection of targets, avoidance of intrusions, or orientation determination. The intent is that the unit can make these determinations automatically and could provide retuning if needed. In addition, if there has been a change, a maintenance alert can be sent to the central processing services for manual intervention and service repair. The phased array radar could also be used in a simplified mode. In this mode it sends a pulse width modulated signal or non-phase shifted mode to simulate the use of an ultrasonic sensor. This would be for backward compatibility in emergent circumstances.

Because of the enhanced abilities provided by the phased array radar, the exemplary system can be utilized even in a densely packed vault or manhole (see example of FIG. 8), as the fine beams can scan through the openings between the cables to detect the vault's floor and/or any storm water accumulating within the vault. Obstructions can be steered away from, once they are detected and/or identified. The array can also be utilized in a multi-operation manner, that is a command from a central system can put the array in one of several detection, scanning modes. For example, upon occurrence of a severe storm, the scanning rate or resolution could be increased or vice versus, during a dry period, the rate reduced. Moreover, with a phased array, the presence of multiple antennas and transceivers, in the system also provides a certain degree of redundancy or resilience to single (or low number) antenna/transceiver failure, as the array can still function albeit less perfectly.

Figure 12:
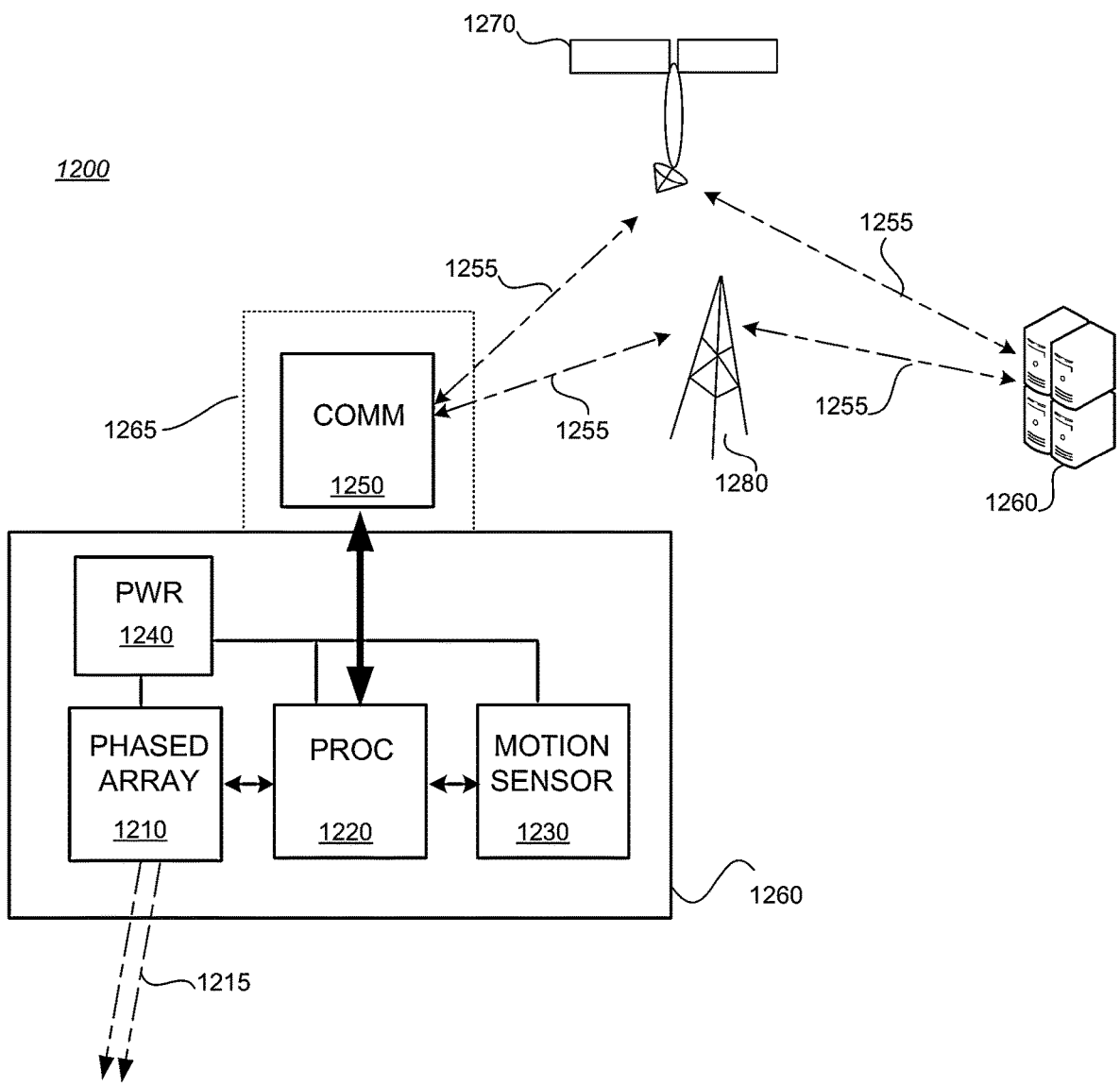
FIG. 12 is a block diagram illustrating some of the key components of an exemplary manhole, vault monitoring system using a phased array radar.

FIG. 12 is a block diagram illustrating some of the key components of an exemplary manhole, vault monitoring system 1200 using a phased array radar, and attendant up/down stream support systems. As is apparent to one of ordinary skill, the key components for the phased array operation may be co-located (combined based on circuitry sophistication) or discretely located. The phased array radar imaging subsystem 1210, being positioned above a manhole or vault or other cavity, is controlled by a microcontroller/processor subsystem 1220. The Microcontroller/processor subsystem 1220 may include an on-chip signal processor, if needed, or the signal processor may be off-chip.

As the images from the phased array 1210 could generate a significant amount of data, the local microcontroller/processor subsystem 1220 would be deployed to analyze the data for simplified parameters, to reduce the volume of data to be transmitted. For example, a 64 by 64 image array might be gathered, but only the deepest depth measurement would be transmitted. Statistical values such as mean, standard deviation, min, max, median, skewness, and kurtosis would be measured to assess the quality of the data measured.

A cover or lid sensor subsystem 1230 detects motion of the cover and is in communication with the microcontroller/processor subsystem 1220. Microcontroller/processor subsystem 1220 is coupled to an external communication subsystem 1250 (having an antenna) for wireless data transmission/reception to/from a satellite 1270 or cell tower/repeater 1280 to a central server 1260, via links 1255. Power providing subsystem 1240, provides power to the respective device subsystems 1210, 1220, 1230, and 1250. The power providing subsystem 1240 can be a rechargeable battery, a non-rechargeable battery, solar power, street vibrations, thermoelectric generators, or from air flow in the manhole/vault, etc.

The exemplary phased array radar imaging subsystem 1210, microcontroller/processor 1220 subsystem, cover sensor subsystem 1230, and power providing subsystem 1240 can be packaged as a single unit, and attached to a manhole, vault, cover, hatch, or entrance door for field operations. The unit can be encased in a waterproof, and physically robust enclosure 1260 to prevent physical or environmental damage. Portions or all of the enclosure 1260 can be radar transparent. Communication subsystem 1250 (or just its antenna) can be separately enclosed 1265 according to design preference, or enclosed as part of enclosure 1260. For usability in outdoor environments, the unit can be substantially temperature invariant, being capable of proper operation from −20 C to 70 C, for example.

The protective casing 1260 (and/or 1265) can be attached by drilling holes in the cover and using hardware such as nuts and bolts. They could also be attached with a bracket, or using magnets and adhesives. They could be attached by connecting to built-in connectors in the manhole cover. The attachment mechanism is such that the overall system can be easily installed, serviced and replaced as needed. As one of ordinary skill in the art understands there are countless numerous other ways to attach a device or device-containing encasing, such changes and modification are within the scope of this disclosure.

The means for attachment allows for cleaning to remove debris from the components. The means for attachment is fabricated to be close to the manhole cover to prevent damage if the manhole cover is slid sideways. Attaching the exemplary system to the enclosure entrance avoids the need for confined space entry for installation or maintenance.

In operation, the above system's components are coordinated by the microcontroller/processor subsystem 1120, which can operate as a main control. This main control can determine the time, gathers image data from the phased array system 1210, can perform specified statistical calculations, stores data for later transmission if communications are down, can send data to the communications subsystem 1250, can receive remote commands sent through the communication system 1250 from a central server 1260, can determine the status of the power subsystem 1240, received signal strength, and local tilt and/or acceleration metric from cover sensor subsystem 1230, and can perform custom algorithmic control adapting to local application needs. The main control also can receive commands to reprogram itself for software updates. The main control can also perform, if so desired, cryptographic key management, encoding and decoding for secure communications. The main control can also compress and decompress data or programs to reduce communications bandwidth requirements.

Additionally, the system's operation could be continuous, or intermittent to save power. The operation could be triggered by short bursts, seeking changes in water level, before detailed scanning. The array could also be triggered by remote commands, based on observing other external sensors, such as rain gauges, or tides and wind, etc.. Further, during a power save mode or loss of communication, measurement data can be locally cached in memory and can be transmitted when proper communications are restored.

In view of the above, a prototype embodiment was developed using an off-the shelf automotive radar, for example, Model AWR1642 single-chip 76-81 Ghz module, being compact, single board and approximately 8×10 cm in size. Of course, other types and modules as well as sizes are possible.

Figure 13:
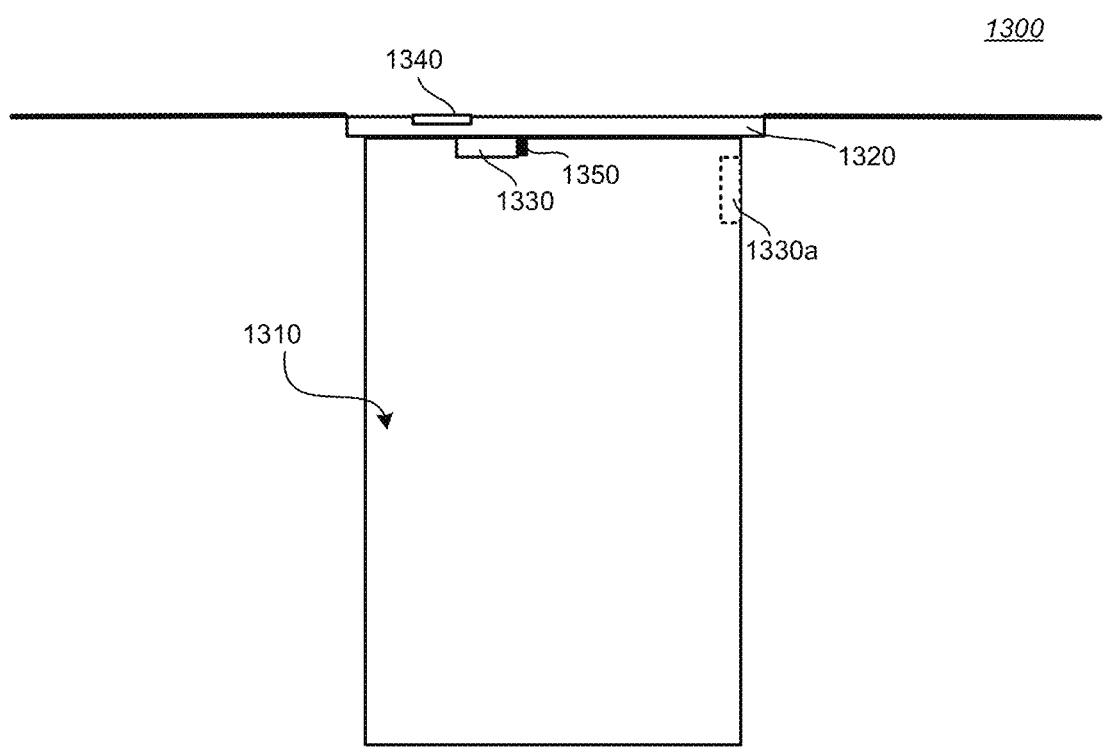
FIG. 13 is a simple illustration showing a manhole or vault with an exemplary phased array system installed in the cover.

FIG. 13 is a simple illustration 1300 showing a deployed embodiment for a manhole or vault 1310 with a cover 1320. Attached to the cover 1320 is an exemplary phased array radar system 1330 and communications antenna 1340. The exemplary phased array radar system 1330 can be affixed directly to the cover 1320 of via an attachment means 1350. By means of the communications antenna 1340, measurements from the phased array radar system 1330 can be transmitted to a remote server. (not shown). Also shown is an alternative placement position 1330*a* within the manhole 1310. While FIG. 13 shows the exemplary phased array radar system 1330 being attached to the cover 1320, it is understood that the exemplary phased array radar system 1330 may be attached a hatch, or door of an enclosure entry, or side of the manhole or vault.

The structure of the cover 1320 could include the components of the phased array system 1330 embraced in the material of the cover. For example, a composite cover could be molded with the phased array(s) included in the mold. This would also include wiring connections and structural brackets for securing the related control, communications, and power systems.

It should be further understood that this and other arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A covered enclosure surface sensing device, comprising:
    a phased array radar sensor, with a 2-D antenna array on chip, capable of electronically steering a radar beam to create a three-dimensional image by scanning a field of view, adapted for placement in an upper portion of the covered enclosure, wherein at least a bottom of the enclosure is scanned;
    a processor module, processing data from and to the phased array radar sensor;
    a motion detector;
    a communication module with a data link to the processor module, and coupled to a communication antenna directing communication away from the enclosure;

a power source, providing power to the phased array radar sensor, processor module, motion detector and communication module; and an environmental encasing, protecting the phased array radar sensor, processor module, power source, communication module, and motion detector, the environmental encasing configured to be attached proximal to a bottom of a lid of the enclosure or an upper side surface of the enclosure, wherein the phased array radar sensor operates to scan within the enclosure for at least one of flexible surfaces and obstructions a level of liquid or powder in a bottom of the enclosure, a reference position of an open channeled-inlet and an open channeled outlet in the enclosure, a level of liquid in the inlet and outlet, and a speed of fluid in the inlet and the outlet, wherein a reorientation scan of the enclosure is performed by the phased array radar sensor after the motion detector detects a threshold movement of the lid.

2. The device of claim 1, wherein the phased array radar sensor operates within a frequency range between 10-200 GHz and the 2-D antenna array is approximately less than 8 cm×10 cm.

3. The device of claim 1, wherein there are a plurality of open channeled inlets.

4. The device of claim 3, wherein the lid is a manhole cover or utility vault cover.

5. The device of claim 1, wherein the measurement provides data enabling a determination of at least one of a type of structure of the bottom, shapes below the lid, and obstructions below the lid, and whether the type of structure of the bottom is circular or linearly orientated.

6. The device of claim 1, wherein the environmental casing is waterproof and at least a portion of the environmental casing proximal to the phased array radar sensor is radar transparent.

7. The device of claim 1, wherein the motion detector is an accelerometer.

8. The device of claim 1, wherein at least one of a median value measurement, estimation process measurement, and series of measurements are used to calculate an occluded area of at least one of a channel and pipe within the enclosure, enabling an estimate of fluid flow in the at least one channel and pipe.

9. The device of claim 1, wherein an estimation of water flow per unit time of water over a weir within the enclosure is derived from two measurement points established on either side of the weir.

10. The device of claim 1, wherein an estimate of flow of water per unit time through a flume in the enclosure is derived from at least two measurement points established upstream and downstream from the flume.

11. The device of claim 1, wherein a flow of water from a drop hole in the enclosure is derived from at least two measurement points established to measure a water level from the enclosure's bottom and from the drop hole.

12. The device of claim 1, further comprising at least one of a satellite, cell tower, and repeater, receiving data from the communication module and a server, processing the received data forwarded from the least one satellite, cell tower, and repeater.

13. The device of claim 12, wherein two-way communications are wirelessly established between the communication module and the server, for reporting of conditions within the enclosure and receiving commands from the server.

14. The device of claim 13, further comprising an external environmental sensor, communicating to the server.

15. The device of claim 1, further comprising an attachment mechanism to attach the environmental encasing to the bottom of the lid of the enclosure or the upper side surface of the enclosure.

16. The device of claim 1, wherein the power source is at least one of batteries, a solar panel, and a thermoelectric generator.

17. The device of claim 1, wherein the surface sensing device is encapsulated within the lid.

18. The device of claim 1, wherein the phased array radar sensor determines a Doppler velocity of fluid in the enclosure bottom.

19. The device of claim 1, wherein the phased array radar sensor is comprised of a plurality of separate antenna arrays.

20. A method to monitor a covered enclosure's bottom surface(s) having at least one of an open channel inlet and open channel outlet for material flow, comprising:

mounting an environmental protective encasing, containing a phased array radar sensor with a 2-D antenna array on a chip, a processor, a power source, a communication module, and a motion detector, proximal to a bottom of a lid of the covered enclosure or an upper side surface of the enclosure;

scanning an electronically steered radar beam to create a three-dimensional image data within the phased array radar sensor's field of view, to create an image of at least a bottom and walls of the enclosure, shapes or obstructions below the lid, and sense directions for measurements;

measuring at least a level of material or powder in a bottom of the enclosure, a level of liquid in the open channel inlet and open channel outlet, a position of the open channel inlet and open channel outlet, and a speed of fluid in the open channel inlet and open channel outlet;

processing the data from the phased array radar sensor;

detecting motion of the at least one of the environmental casing and, wherein upon a lid motion detection, rescanning after a predetermined period of time of post-motion detection to establish a recalibrated three-dimensional image data;

communicating at least one of the detected motion and processed data to an external server; and receiving instructions from the server for at least one of scanning and measuring, wherein real-time level and flow data in the enclosure is obtained.

21. The method of claim 20, wherein the measuring is periodic, a non-operating portion of the measuring being longer than a measuring portion to minimize power consumption.

22. The method of claim 20, further comprising, automatically scanning and calibrating, to minimize in-person occupation in the enclosure.

23. The method of claim 20, wherein measurement data is locally cached in a processor memory and transmitting the measurement data to the server at a predetermined time.

24. The method of claim 20, wherein the scanning and measuring is performed within a temperature range greater than −20 C and less than 70 C.

25. The method of claim 20, where the measurements have a level resolution less than 3 mm.

26. The method of claim 20, wherein the at least one of the scanning and measurements utilizes polarized waves.

27. The method of claim 20, wherein the at least one of the scanning and measurements is at least one of frequency, amplitude modulated, and Doppler identified.

* * * * *